(12) United States Patent
Madour et al.

(10) Patent No.: US 6,611,532 B1
(45) Date of Patent: Aug. 26, 2003

(54) METHODS AND APPARATUS FOR INTEGRATING SIGNALING SYSTEM NUMBER 7 NETWORKS WITH NETWORKS USING MULTI-PROTOCOL LABEL SWITCHING

(75) Inventors: Lila Madour, Kista (SE); Shabnam Sultana, Kista (SE)

(73) Assignee: Telefonaktielbolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/454,589

(22) Filed: Dec. 7, 1999

(51) Int. Cl.$^7$ .............................. H04J 3/16; H04J 3/22
(52) U.S. Cl. .................. 370/466; 370/410; 370/238; 370/392; 370/467; 370/401; 379/221.1; 379/229
(58) Field of Search .................. 370/352–356, 370/400–401, 389, 386, 392, 397, 399, 384, 385, 373, 465, 466, 467, 410, 409; 379/229, 219; 709/249, 250

(56) References Cited

U.S. PATENT DOCUMENTS 6,408,001 B1 * 6/2002 Chuah et al. ............... 370/392
6,473,421 B1 * 10/2002 Tappan ....................... 370/351
6,529,499 B1 * 3/2003 Doshi et al. ................ 370/352

OTHER PUBLICATIONS

US Publication 2002/0110119A1, Fredette et al., Method and apparatus for stream aggregation in a MPLS network environment.*
US Publication 2002/0181485A1, Cao et al., Apparatus and method for internet protocol flow ring protection switching.*
Viswanathan, A. et al., "Evolution of Multiprotocol Label Switching", IEEE Communications Magazine, US, IEEE Service Center, Piscataway, NJ, vol. 36, No. 5, May 1, 1998, pp. 165–173.
Dumortier, P., "Towards a New IP Over ATM Routing Paradigm", ISS. World Telecommunications Congress, CA, Toronto, Pinnacle Group, 1997, pp. 189–195.
Le Faucheur, F., "IETF Multiprotocol Label Switching (MPLS) Architecture", IEEE International Conference on ATM, XX, XX, Jun. 22, 1998, pp. 6–15–15.
Veeraraghaven M., et al., "ATM Switch Routers for Combined Connection–oriented and Connectionless Transport", Global Telecommunications Conference (Globecom), US, New York, IEEE, 1997, pp. 1481–1487.
ANSI T1.110–1992 (Revision of ANSI T1.110–1987). "Signalling System No. 7 (SS7)—General Information." Foreward, Chapters T1.110.1, T1.110.2, T.1.110.3, and T1.110.4.
Anderson, Loa et al., "LDP Specification." Network Working Group, Internet Draft of Internet Engineering Task Force, Jun. 1999, p.1–124
Rosen, Eric C. et al., "Multiprotocol Label Switching Architecture." Network Working Group, Internet Draft of Internet Engineering Task Force, Apr. 1999, pp. 1–62.

* cited by examiner

*Primary Examiner*—Ricky Ngo
*Assistant Examiner*—Yvonne Q. Ha

(57) ABSTRACT

Techniques for implementing Multi-Protocol Label Switching (MPLS) directly in an SS7 protocol stack enable SS7 network layer protocols to interface, via MPLS, with literally any link layer technology. As a result, label switching can be used seamlessly throughout a collection of heterogeneous networks, including both IP-based and SS7-based networks. An exemplary method of routing SS7 data packets through a heterogeneous packet-switching network using MPLS includes the steps of: establishing an MPLS forwarding equivalence class (FEC), at least one element of the FEC being an SS7 destination; associating a label with the FEC at a first router in the heterogeneous packet switching network; attaching the label, at the first router, to a data packet belonging to the FEC; and forwarding the labeled data packet from the first router to a second router in the communications network. The SS7 destination can be, for example, a Destination Point Code (DPC), a Signaling Connection Control Part (SCCP) global title, or an SCCP subsystem number (SSN).

20 Claims, 8 Drawing Sheets

METHODS AND APPARATUS FOR INTEGRATING SIGNALING SYSTEM NUMBER 7 NETWORKS WITH NETWORKS USING MULTI-PROTOCOL LABEL SWITCHING

FIELD OF THE INVENTION

The present invention relates to packet-switching communications networks, and more particularly, to the integration of Signaling System Number 7 (SS7) networks with more recently developed data communications (datacom) networks utilizing Multi-Protocol Label Switching (MPLS).

BACKGROUND OF THE INVENTION

Today, communications networks are designed using layered architectures in which peer processes residing on different nodes within a network communicate without regard to the detailed operation of the lower-layer processes required to carry out that communication. Advantageously, such layered architectures result in standard, interchangeable and widely available network modules.

Most of the layered networks of today resemble the seven-layer Open Systems Interconnection (OSI) reference model put forth by the International Standards Organization (ISO). See, for example, D. Bertsekas and R. Gallager, Data Networks, Prentice-Hall, Inc., 1987, pp. 14–26. According to the OSI reference, a network includes, from lowest to highest level of abstraction, a physical layer, a data link layer, a network layer, a transport layer, a session layer, a presentation layer, and an application layer.

The physical layer (or layer 1) provides a virtual link for transmitting sequences of bits between any pair of nodes in a network, while the data link layer (or layer 2) performs error-checking and other functions to convert the potentially unreliable bit pipes of layer 1 into reliable links for bi-directional transmission of data packets (i.e., groups or frames of bits) between nodes. Additionally, the network layer (or layer 3) provides routing and flow control for data packets passing through and within the network, while the transport, session, presentation and application layers (layers 4–7, respectively) provide increasingly higher levels of functionality which are well known in the art of network design.

Most datacom networks of today (e.g., the networks used to implement the well known Internet) generally adhere to the above described layered architecture. More specifically, datacom networks typically utilize any of a number of widely available network layer protocols for packet routing and flow control, as well as any of a number of available data link layer protocols for error-checking, etc. Thus, as shown in FIG. 1, an exemplary datacom network 100 can incorporate a number of network protocols 110, including the well known Apple Talk™ protocol and various versions of the equally well known Internet Protocol (IPv6, IPv4, IPX). As is also shown in the figure, the exemplary network 100 can further incorporate a number of data link protocols 120, including the Ethernet (ET) protocol, the Fiber Distribution Data Interface (FDDI) protocol, the Asynchronous Transfer Mode (ATM) protocol, the Frame Relay (FR) protocol, and the Point-to-Point protocol (PPP), each of which is well known in the art.

Conventionally, routing of packets in an IP-based network is performed entirely at the network layer. Specifically, upon a data packet arriving at a network node, or router, the network-layer process operating at the node compares a destination address included with the packet to a list of address prefixes stored within a routing table maintained at the node. Upon finding a longest matching prefix, the node then forwards the packet on to another node associated with the longest matching prefix (i.e., to a "next hop" router), where the matching process is repeated. In this way, packets hop from node to node, ultimately making it to the packet destination address (and ideally via a best path).

Recently, MPLS technology has been developed to reduce the amount of time and computational resources used in the above described routing mechanism. More specifically, MPLS replaces the need to do the longest prefix match at each router by inserting a fixed length label between the network layer header and the link layer header of each data packet. As is described in more detail hereinafter, a router can thus easily make a next hop decision for an incoming packet merely by using the MPLS label of the packet as an index into a routing table. As shown in FIG. 2, label switching provides an abstraction layer 210 between the network layer protocols 110 and the link layer protocols 120.

Like the above described IP-based networks, the well known SS7 standard (which is used, for example, in implementing many of today's wireless communications systems) is modeled after the OSI seven-layer reference model. See, for example, T. Rappaport, Wireless Communications Principles & Practice, Prentice Hall, Inc., 1996, pp. 463–472.

Thus, as shown in FIG. 3, an exemplary SS7 system 300 includes, among other parts, a first Message Transfer Part (MTP) 310, a second MTP 320, a third MTP 330, a Signaling Connection Control Part (SCCP) 340, and an Integrated Services Digital Network User Part (ISDN User Part, or ISUP) 350. As shown, the first MTP 310 is analogous to the OSI physical layer (layer 1), the second MTP 320 is analogous to the OSI data link layer (layer 2), and the third MTP 330 is analogous to the OSI network layer (layer 3). Additionally, the SCCP 340 and the ISUP 350 perform certain layer 3 and higher functions.

Although both the SS7 standard and the above described IP-based networks are all modeled on the OSI seven-layer reference, the SS7 and IP-based routing mechanisms are sufficiently different that the above described MPLS scheme (developed specifically for IP-based networks) cannot be directly applied in the context of an SS7 network. Consequently, recent efforts to integrate legacy SS7-based telephony systems with next generation systems based on IP-type packet switching technologies (e.g., IP, ATM, etc.), have been difficult.

Although many vendors have already proposed solutions on how SS7 networks can interwork with the IP domain, such solutions have proven unsatisfactory in many respects. Known solutions either use some form of IP encapsulation of SS7 messages, or some form of mapping of SS7 messages into IP Session Initiation Protocol (SIP) messages or H.323 messages, etc. As a result, the known solutions are generally inefficient and do not guarantee a high degree of performance. Consequently, there is a need for improved methods and apparatus for integrating SS7 networks with MPLS-based datacom networks.

SUMMARY OF THE INVENTION

The present invention fulfills the above-described and other needs by providing techniques for implementing MPLS directly in the SS7 protocol stack. As a result, SS7 MTP3 and MTP3bare now additional network layers that can interface, via MPLS, with literally any link layer technology. Consequently, label switching technology can be used seamlessly throughout a collection of heterogeneous networks, including both IP-based and SS7-based networks. Advantageously, the present invention does not merely map messages between IP and SS7 formats, but instead addresses the problem at large by truly integrating the SS7 and IP-based domains.

According to the invention, an exemplary method of routing Signaling System Number 7 (SS7) data packets through a heterogeneous packet-switching network using Multi-Protocol Label Switching (MPLS) includes the steps of: establishing an MPLS forwarding equivalence class (FEC), at least one element of the FEC being an SS7 destination; associating a label with the FEC at a first router in the heterogeneous packet switching network; attaching the label, at the first router, to a data packet belonging to the FEC; and forwarding the labeled data packet from the first router to a second router in the communications network. The SS7 destination can be, for example, a Destination Point Code (DPC), a Signaling Connection Control Part (SCCP) global title, or an SCCP subsystem number (SSN).

The exemplary method can further include the step of advertising (e.g., via a label distribution protocol, or LDP) the label associated with the FEC at the first router to other routers in the communications network. Additionally, the first router can maintain a label information table including a plurality of FECs and associated labels (a number of the FECs including SS7-based elements and another number of FECs including non-SS7-based elements), and can thus serve as a destination for both SS7 data packets and non-SS7 data packets.

An exemplary MPLS router according to the invention includes: a routing table for storing information relating to an MPLS FEC, wherein an element of the FEC can be a Signaling System Number 7 (SS7) destination; and a label switching protocol processor for associating a label with the FEC, attaching the label to a data packet belonging to the FEC, and forwarding the labeled data packet to another router in the communications network. The exemplary router can further include a label distribution processor configured to advertise the label associated with the FEC to other routers in the communications network.

The above-described and other features and advantages of the invention are explained in detail hereinafter with reference to the illustrative examples shown in the accompanying drawings. Those of skill in the art will appreciate that the described embodiments are provided for purposes of illustration and understanding and that numerous equivalent embodiments are contemplated herein.

DETAILED DESCRIPTION OF THE INVENTION

In order to illuminate certain aspects of the invention, brief descriptions of conventional MPLS and SS7 networks are provided immediately hereinafter. A more detailed description of MPLS can be found in, for example, E. Rosen et al., Multiprotocol Label Switching Architecture, Internet Draft draft-ietf-mpls-arc-05.txt, Internet Engineering Task Force (IETF) Network Working Group, April 1999, which is incorporated herein in its entirety by reference. A more detailed description of SS7 can be found in, for example, American National Standards Institute (ANSI) Standard T1. 110–1992, Signaling System Number 7—General Information, 1992, which also is incorporated herein in its entirety by reference.

Generally, label switching can be decomposed into a forwarding component and a control component. In the forwarding component, next hop decisions made by a label switching router (LSR) for incoming packets are based on two sources of information: a forwarding table maintained by the LSR; and the labels carried by the packets themselves. More specifically, the forwarding table is indexed by the value contained in an incoming label. In other words, the value contained in the incoming label component of the Nth entry in the table is N.

Each entry in the routing table at an LSR contains all the information necessary to forward a packet, as well as the information required to decide what resources to use. Conventionally, there can be one forwarding table per interface at each LSR. In such case, the handling of the packet is determined by both the packet label and the interface the packet arrives on.

Figure 4:
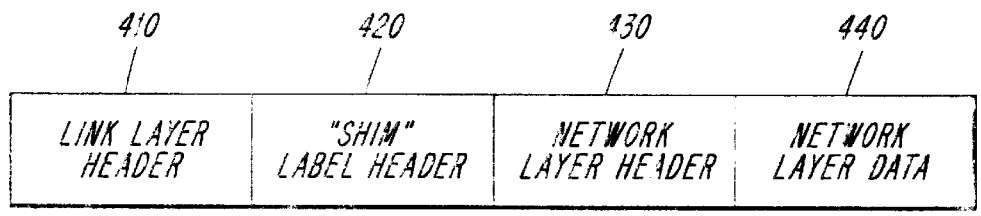
FIG. 4 depicts an exemplary data packet header structure which can be used in implementing the invention.

With respect to the MPLS forwarding component, note that an MPLS label can be carried in a data packet in at least two ways. For example, a label can be carried directly in a link layer header (e.g., by substituting a label for the Virtual Path or Virtual Circuit identifier in an ATM header). Alternatively, the label can be carried in a small "shim" header inserted between the link layer header and the network layer header of a data packet as shown in FIG. 4.

Figure 5:
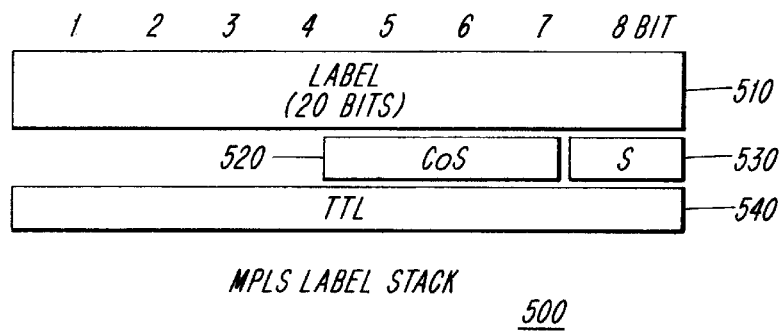
FIG. 5 depicts an exemplary MPLS label stack which can be used in implementing the invention.

Note also that an MPLS label can actually include a number of fields as shown in FIG. 5. In the figure, an exemplary label 500 includes a literal label field 510 (which contains the actual value for the label and which is used by an LSR to identify a next hop for a packet as described below), a Class of Service Field 520 (which can be used in conjunction with scheduling and discard algorithms), a Stack field 530 (which is used to indicate the bottom of the MPLS Label Stack), and a Time to Live field 540 (which can be used to set a limit on the time a packet can traverse a network without arriving at its destination).

The forwarding tables that contain mappings between MPLS labels and next hops are built using information carried by the MPLS control component. The control component consists of procedures by which an LSR can create bindings between labels and forwarding equivalence classes (FECs). An FEC is created by partitioning the set of all possible packets that a router can forward, and the packets within each FEC are treated by an LSR in the same way (e.g., sent to the same next hop). An example of an FEC is a subset of packets, all of which have the same source and destination address.

The criteria used to define an FEC determines its forwarding granularity. For example, an FEC with coarse granularity can include packets having a network layer destination address which matches a particular address prefix, while an FEC with fine granularity can include packets having the same source, destination IP address and traffic class.

Each FEC is specified as a set of one or more FEC elements, each FEC element identifying the set of packets which can be mapped to a specific Label Switched Path (LSP). An LSP is a sequence of network nodes and can be shared by multiple FEC elements. In conventional MPLS, the defined FEC elements are Address prefix and Host address.

In addition to creating bindings between labels and FECs, an LSR can also utilize the MPLS control component to inform other LSRs of the bindings it creates and to construct and maintain the forwarding table used by the above described MPLS forwarding component.

Figure 6:
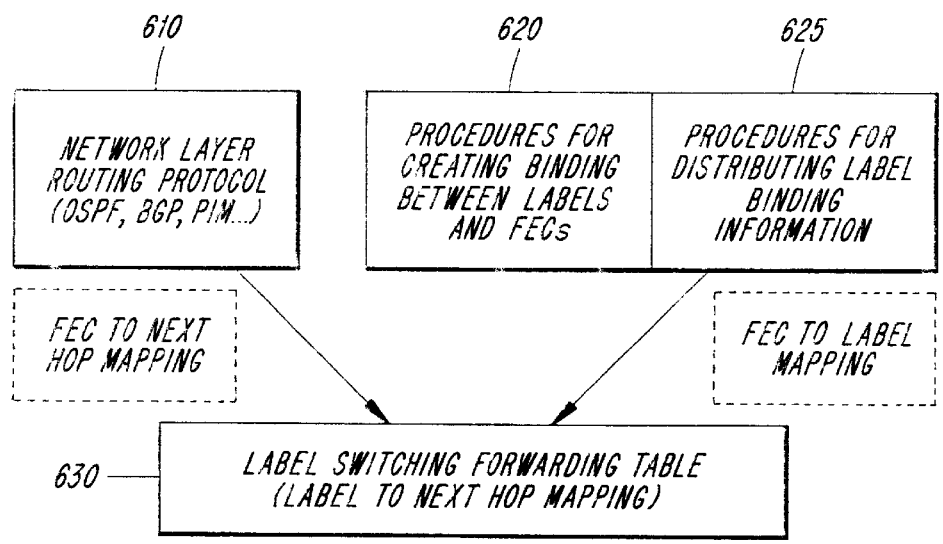
FIG. 6 depicts construction of an MPLS routing table which can be used in implementing the invention.

Thus, the overall structure of the MPLS control component is as shown in FIG. 6, wherein a number of network layer routing protocols 610 provide an LSR with mappings between FECs and next hop addresses, and wherein procedures 620, 625 for creating label bindings between labels and FECs, and for distributing the binding information among routers, provide the LSR with mappings between FECs and labels. The two mappings combined enable the LSR to construct the routing tables 630 which are used by the MPLS forwarding components.

The distribution of the labels among LSRs can be carried out in at least two ways. For example, the information can be piggybacked on top of the routing protocols, or by using a separate protocol developed by the IETF and known as the Label Distribution Protocol (LDP). A brief description of the LDP is provided immediately hereinafter, and a more detailed description of the LDP can be found in, for example, L. Anderson et al., LDP Specification, Internet Draft draft-ietf-mpls-ldp-05.txt, IETF Network Working Group, June 1999, which is incorporated herein in its entirety by reference.

Generally, the LDP consists of procedures and messages by which LSRs establish LSPs through a network by mapping network layer routing information directly to data link switched paths. An LSP can have an endpoint at a directly attached neighbor or at a network egress node, enabling switching via all intermediary nodes. The LDP associates the FEC with each LSP it creates, and LSPs are extended through the network as each LSR "splices" incoming labels for an FEC to the outgoing label assigned to the next hop for the given FEC.

The above noted IETF LDP draft describes four categories of LDP messages: Discovery messages, used to announce (using the HELLO message periodically) and maintain the presence of an LSR in a network; Session messages, used to establish, maintain and terminate sessions between LDP peers; Advertisement messages, used to create, change and delete label mappings for FECs; and Notification messages, used to provide advisory information and to signal error information. The Advertisement messages carrying the FEC attributes can include: a Label mapping message; a Label request message; a Label abort request message; a Label withdraw message; and a Label release message.

The LSR that creates a binding between a particular label L and a particular FEC F is known as the downstream LSR with respect to that binding. The downstream LSR informs an upstream LSR of the binding using one of the above messages, and both LSRs thus become LDP peers. The selection of a label for a particular FEC is known as route selection and can be performed on the basis of hop-by-hop routing or by explicit routing.

Figure 7:
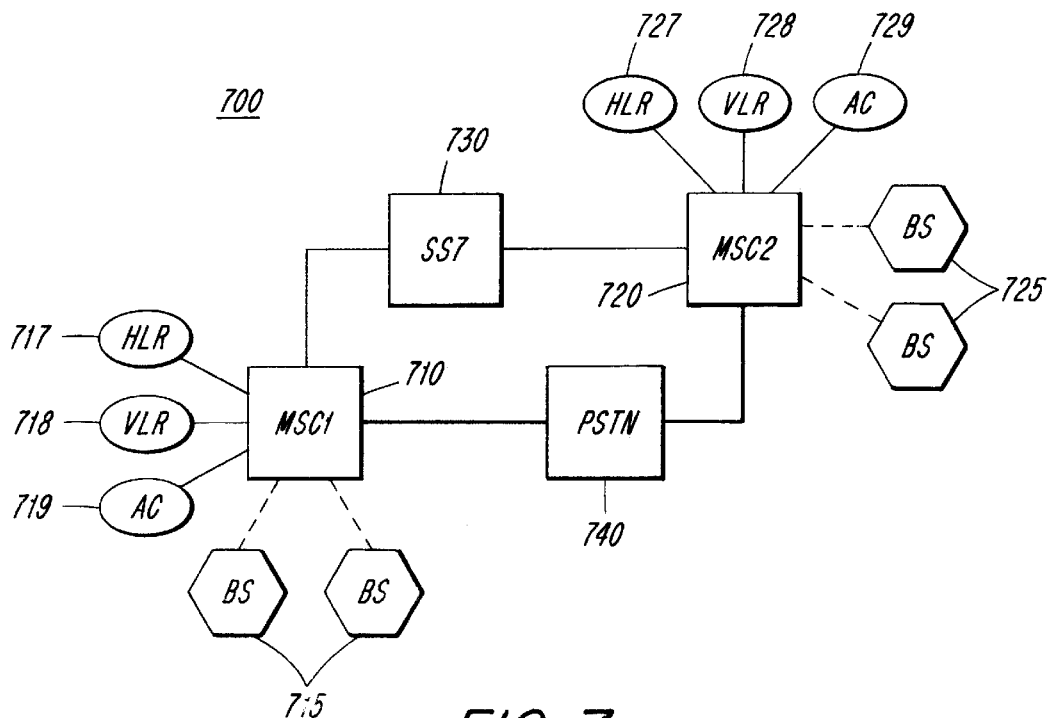
FIG. 7 depicts an exemplary SS7-based communications system in which the teachings of the present invention can be implemented.

Turning now to a brief description of the SS7 standard, FIG. 7 depicts an exemplary telecommunications system 700 in which an SS7 network 730 is utilized. In addition to the SS7 network 730, the exemplary system 700 includes a first wireless telephony system, comprising a first Mobile Switching Center (MSC) 710, a plurality of first base stations 715, a first home location register (HLR) 717, a first visitor location register (VLR) 718, and a first authentication center (AC) 719. The exemplary system further includes a second wireless telephony system, comprising a second MSC 720, a plurality of second base stations 725, a second HLR 727, a second VLR 728, and a second AC 729. Additionally, the exemplary system 700 includes the well known Public Switched Telephone Network (PSTN) 740.

In operation, mobile terminals within a coverage area of the first wireless system communicate with the first base stations 715, while mobile terminals within a coverage area of the second wireless system communicate with the second base stations 725. At the same time, the first and second MSCs 710, 720 perform call handling, permit mobile terminal roaming, and carry out billing, fraud detection, and other functions, utilizing the HLRs 717, 727, the VLRs 718, 728, and the ACs 719, 729, as is well known in the art. In the system 700 of FIG. 7, long distance voice traffic is carried via the PSTN 740, while signaling information used to provide call set-up and to inform MSCs about particular users is carried via the SS7 network 730.

Figure 8:
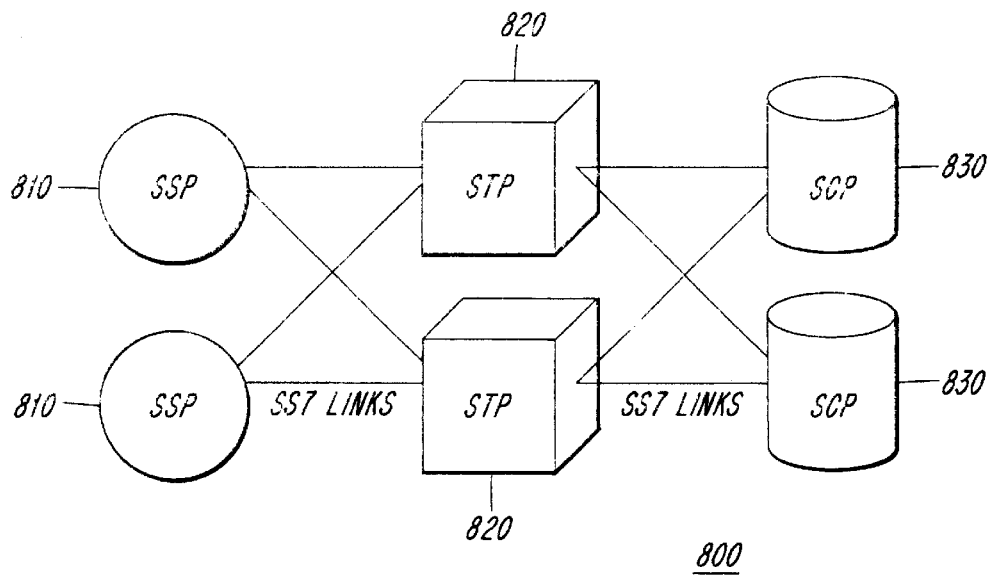
FIG. 8 depicts components in an exemplary SS7 network in which the teachings of the invention can be implemented.

In the SS7 network 730, there are no LSRs. Instead, the SS7 network 730 includes a number of Signaling Points, each Signaling Point being uniquely identified by a numeric point code. As shown in FIG. 8, there are three types of Signaling Points in an SS7 network: Service Switching Points (SSPs) 810, Signaling Transfer Points (STPs) 820, and Service Control Points (SCPs) 830. As is well known in the art, the STPs 820 operate to transfer an SS7 packet to its destination based on a destination point code included in the routing label of the packet, or based on other addresses such as a global title and a subsystem number included by the SS7 SCCP on top of MTP3.

As noted in the above Background of the Invention, the SS7 routing mechanism is not well suited for implementation of MPLS. For example, the concept of FECs is conventionally unkown in the context of SS7.

Advantageously, however, the present invention discloses methods and apparatus for using label switching at the edge of an SS7 network so that the SS7 network can interwork with an MPLS network using label switching to forward packets. According to embodiments, a hybrid STP/LSR provides an interface between an SS7 network and an IP-based network through the use of MPLS.

Figure 9:
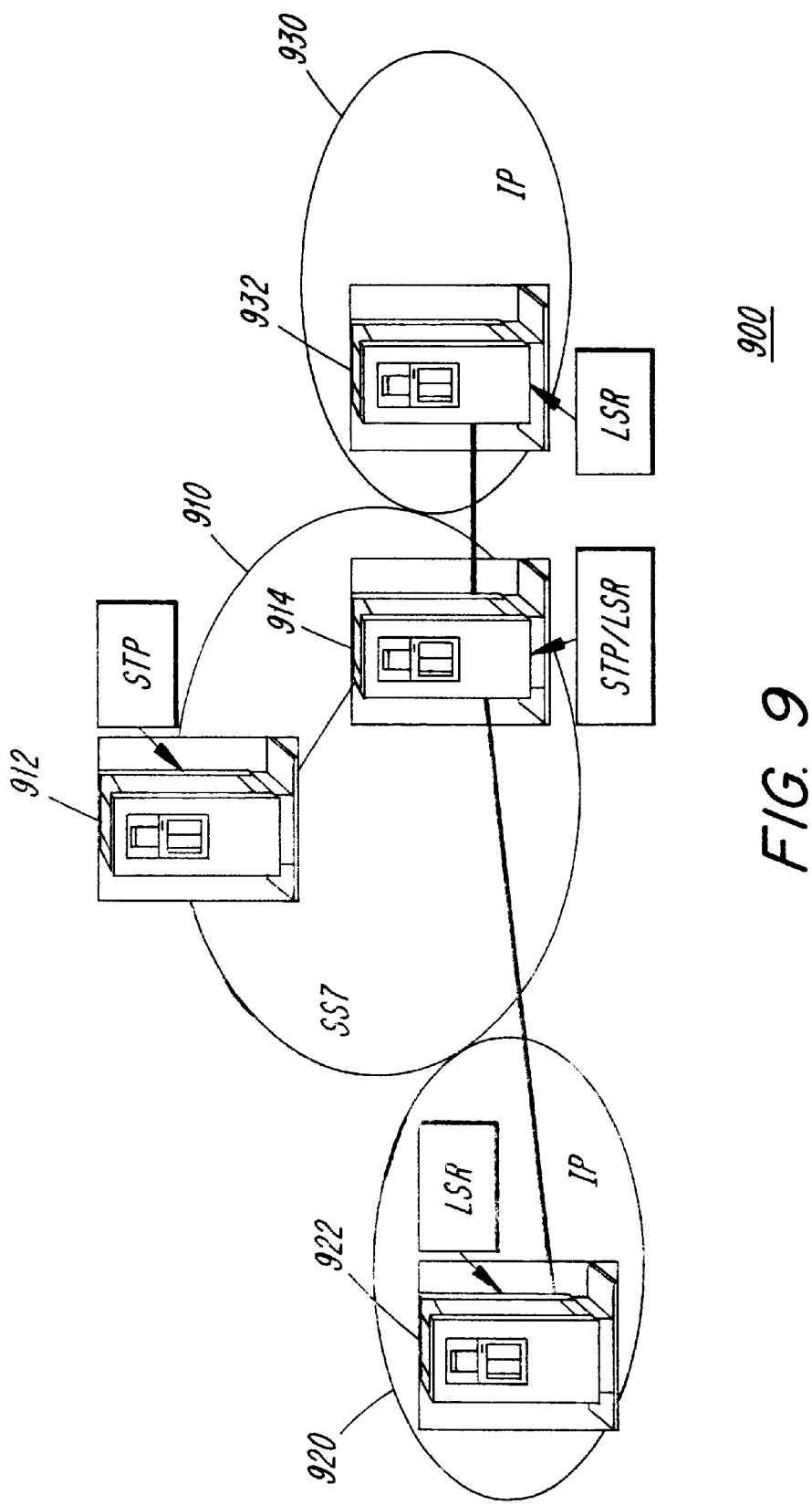
FIG. 9 depicts an exemplary heterogenous network employing MPLS in accordance with the invention.

FIG. 9 depicts an exemplary heterogeneous network 900 incorporating such a hybrid STP/LSR. Specifically, the exemplary network 900 includes an SS7 domain 910 and first and second IP domains 920, 930. As shown, the SS7 domain 910 includes a standard SS7 STP 912, while the first IP domain 920 includes a first standard IP LSR 922, and the second IP domain 930 includes a second standard IP LSR 932. Additionally, a hybrid STP/LSR 914 provides an interface between the SS7 domain 910 and each of the IP domains 920, 930. Those of skill in the art will appreciate that the below described functionality of the STP/LSR 914 can be implemented using, for example, known digital signal processing components or a general purpose digital computer.

During network operation, the STP/LSR 914 is responsible for: maintaining a label forwarding table; distributing labels to LSRs in the IP-based networks; forwarding labeled packets to the IP-based networks; intercepting incoming packets toward the SS7 network; mapping the labels of the incoming packets to SS7 node addresses and sending the resulting SS7 packets to neighboring STPs in the SS7 network; as well as forwarding incoming label packets from one datacom network to another datacom network when the labels do not correspond to destinations in the SS7 network. Thus, the STP/LSR 914 appears as just another STP with respect to the SS7 network 910, and as just another LSR with respect to the IP networks 920, 930.

Figure 1:
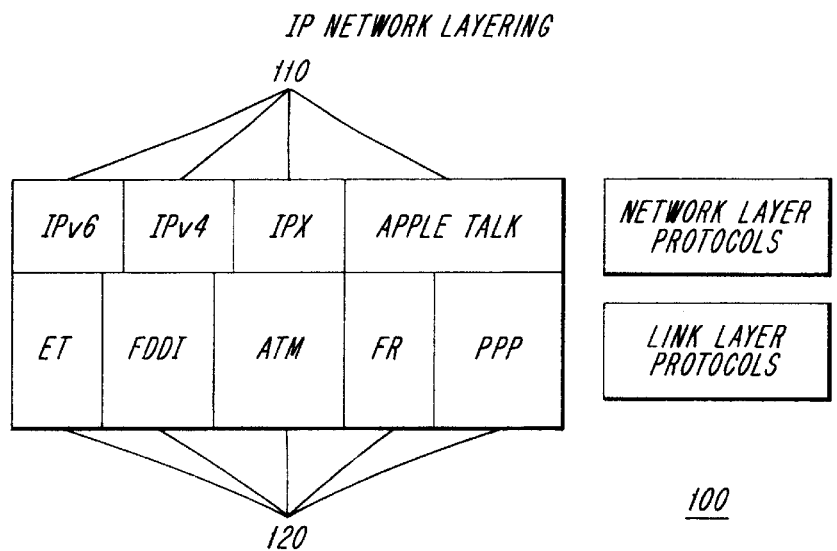
FIG. 1 depicts exemplary network and data link layers in a datacom network in which the teachings of the invention can be implemented.
Figure 2:
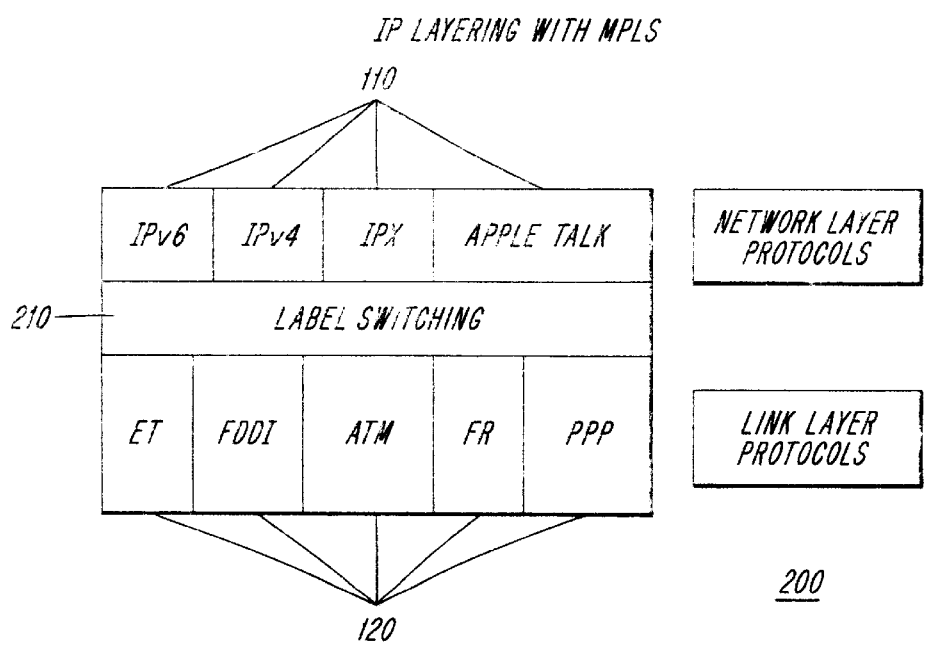
FIG. 2 depicts exemplary network, MPLS, and data link layers in a datacom network in which the teachings of the invention can be implemented.
Figure 3:
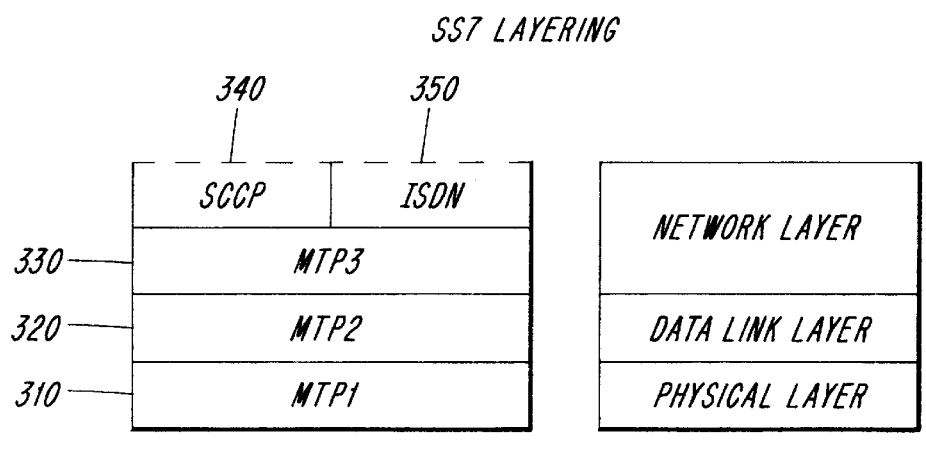
FIG. 3 depicts layering in an exemplary SS7 network in which the teachings of the invention can be implemented.
Figure 10:
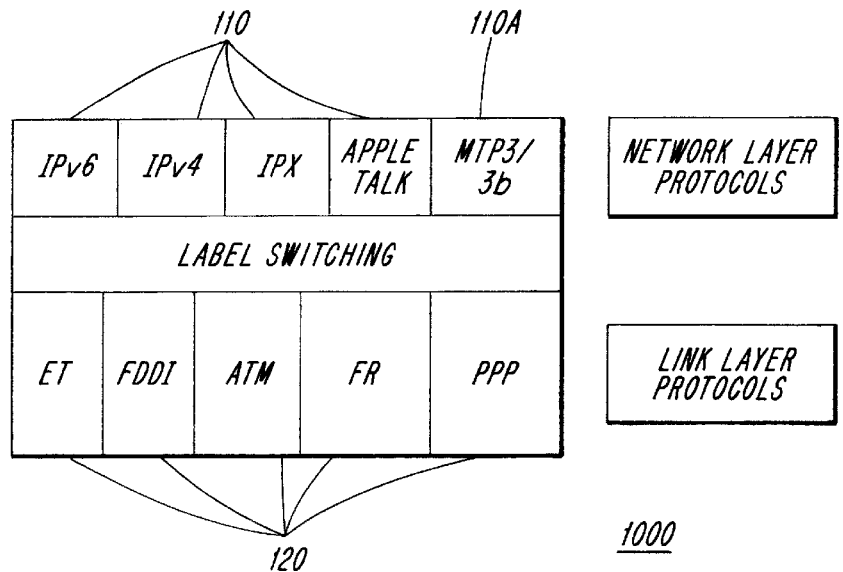
FIG. 10 depicts datacom layering incorporating an SS7 network layer protocol according to the invention.
Figure 11:
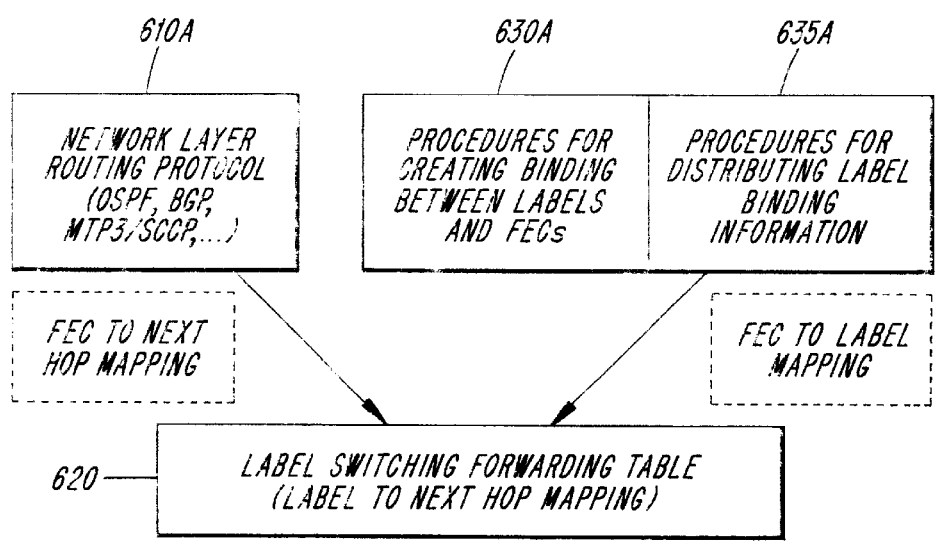
FIG. 11 depicts construction of an MPLS routing table including an SS7 network layer protocol according to the invention.

By using label switching below layer 3, the present invention enables other link layer technologies (e.g., PPP, FR, Ethernet, etc.) to carry the labeled MTP packets. Additionally, the SS7 MTP3 network layer can, according to the invention, be adapted to interface with label switching and thereby provide functional components similar to the forwarding and control components of IP network layer routing. Thus, the invention permits construction of an MPLS network having layering as shown in FIG. 10 and router table development as shown in FIG. 11 (wherein, in each instance, SS7 layer 3 protocols are integrated with conventional IP protocols). Compare FIGS. 10 and 11 with FIGS. 2 and 6, respectively.

To enable an STP/LSR of the invention to operate as described above, FECs are created using, for example, one or more of the following SS7 criteria: Destination point code; Destination point code and subsystem number; Country code of user/terminal address (IMSI or ITU address); National code of user/terminal address (IMSI or ITU address). According to an exemplary embodiment, destination point codes alone are used to create FECs, as doing so requires minimum modification to the MTP3 network layer.

Alternatively, SCCP global titles alone, or SCCP subsystem numbers alone, can be used to create the FECs with minimum modification to the MTP3 layer. Additionally, FECs providing finer forwarding granularity can be based on a combination of more than one of the criteria above. However, doing so results in more extensive add-on to the SS7 network layer.

Once the SS7-based FECs are established, bindings are created between the labels and the FECs, and the label binding information is distributed to the LSRs in the datacom network. While the control component within the SS7 network layer provides procedures to exchange routing information among SS7 STPs, it is not advisable to piggyback the distribution of label-to-FEC mappings on the routing messages of SS7. This results primarily from the fact that routing messages (that is, management routing messages) are not sufficiently supported in the datacom domain.

Instead, the present invention teaches that the above described LDP can be used to distribute MPLS labels from the SS7 domain to the IP domain. According to exemplary embodiments, the LDP procedures and messages are exchanged between an STP/LSR of the invention and a conventional IP-type LSR. Consequently, the STP/LSR is again seen as just another LSR from the standpoint of a peer LSR in an MPLS network.

Like a conventional LSR, the STP/LSR uses Discovery messages to indicate its presence in a network (i.e., by sending a HELLO message periodically). Additionally, the STP/LSR receives Discovery messages from other LSRs that wish to indicate their presence. Advantageously, the discovery, session, and notification messages of LDP need not be modified to provide the desired functionality for the STP/LSR of the invention.

Once the STP/LSR establishes a session with another LSR learned via the HELLO message, advertisement messages are exchanged between the STP/LSR and the conventional LSR. According to the invention, the LDP advertising messages are adapted to accommodate a number of new FEC elements. In addition to the above described Address prefix and Host address, the following new FEC elements can be incorporated: Destination point code (DPC); Destination point code and subsystem number; Country code of user/terminal address (IMSI or ITU address); National code of user/terminal address (IMSI or ITU address).

Figure 12:
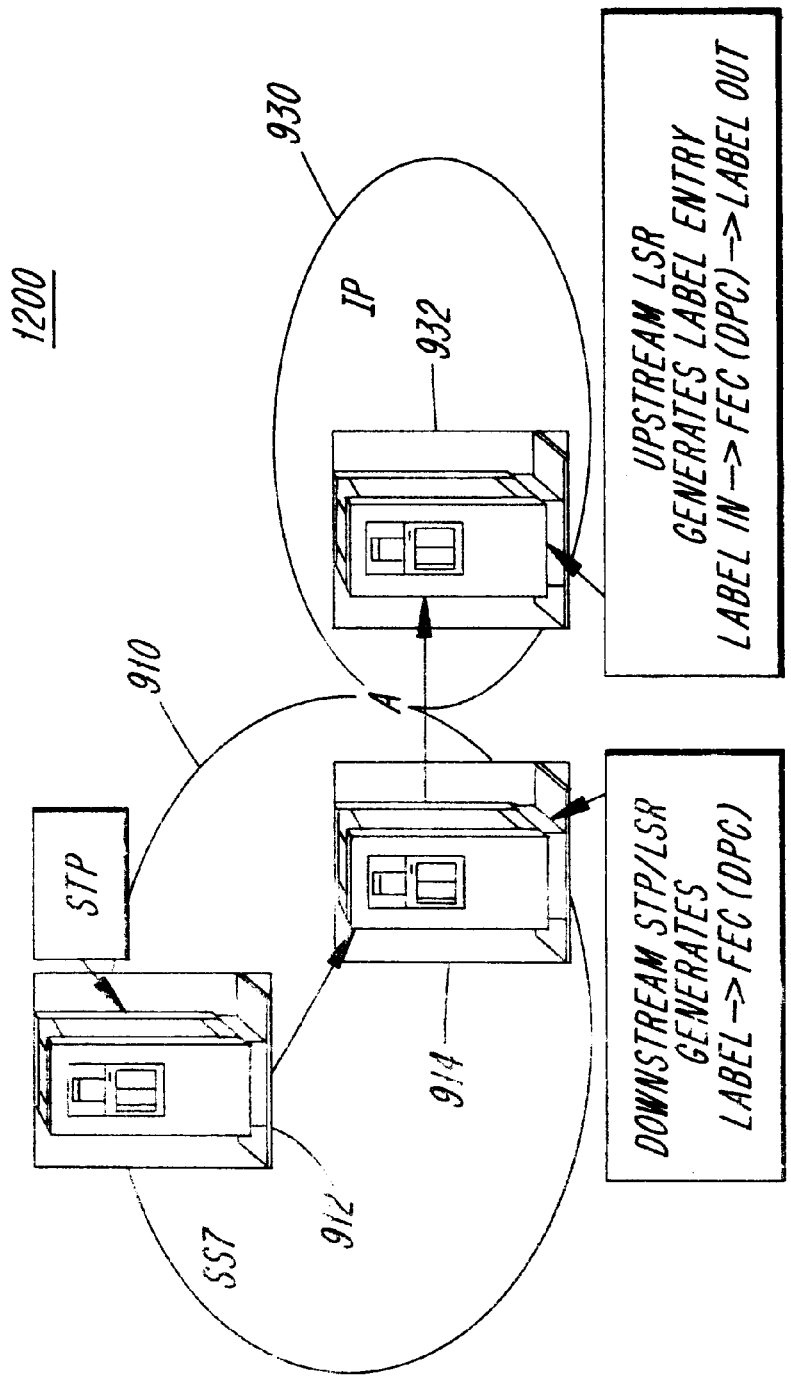
FIG. 12 depicts label distribution from an SS7 router to a label switching router in accordance with the invention.

FIG. 12 depicts an exemplary LDP exchange between the STP/LSR 914 and the second standard LSR 932 of FIG. 9. As shown, the STP/LSR 914 (here acting as a downstream LDP peer) generates a label corresponding to a particular FEC (in this instance, a single DPC), and forwards the label-FEC binding to the standard LSR 932 via an advertising message (as indicated by an arrow A in the figure). The standard LSR 932 (here acting as an upstream LDP peer) in turn generates a label entry for the FEC (i.e., a mapping between the label provided by the STP/LSR 914 and another label generated, and ultimately advertised, by the standard LSR 932 itself), and stores the label entry in its routing table.

Advantageously, once the STP/LSR 914 announces its presence and advertises SS7-type FECs and corresponding labels via the LDP, data packets can be seamlessly exchanged between the SS7 network 910 and the IP-based network 930. By way of example, FIG. 13 depicts a data packet being forwarded from a originating node in one SS7 network, through an intermediary node in an IP-based network, and to a destination node in another SS7 network.

Figure 13:
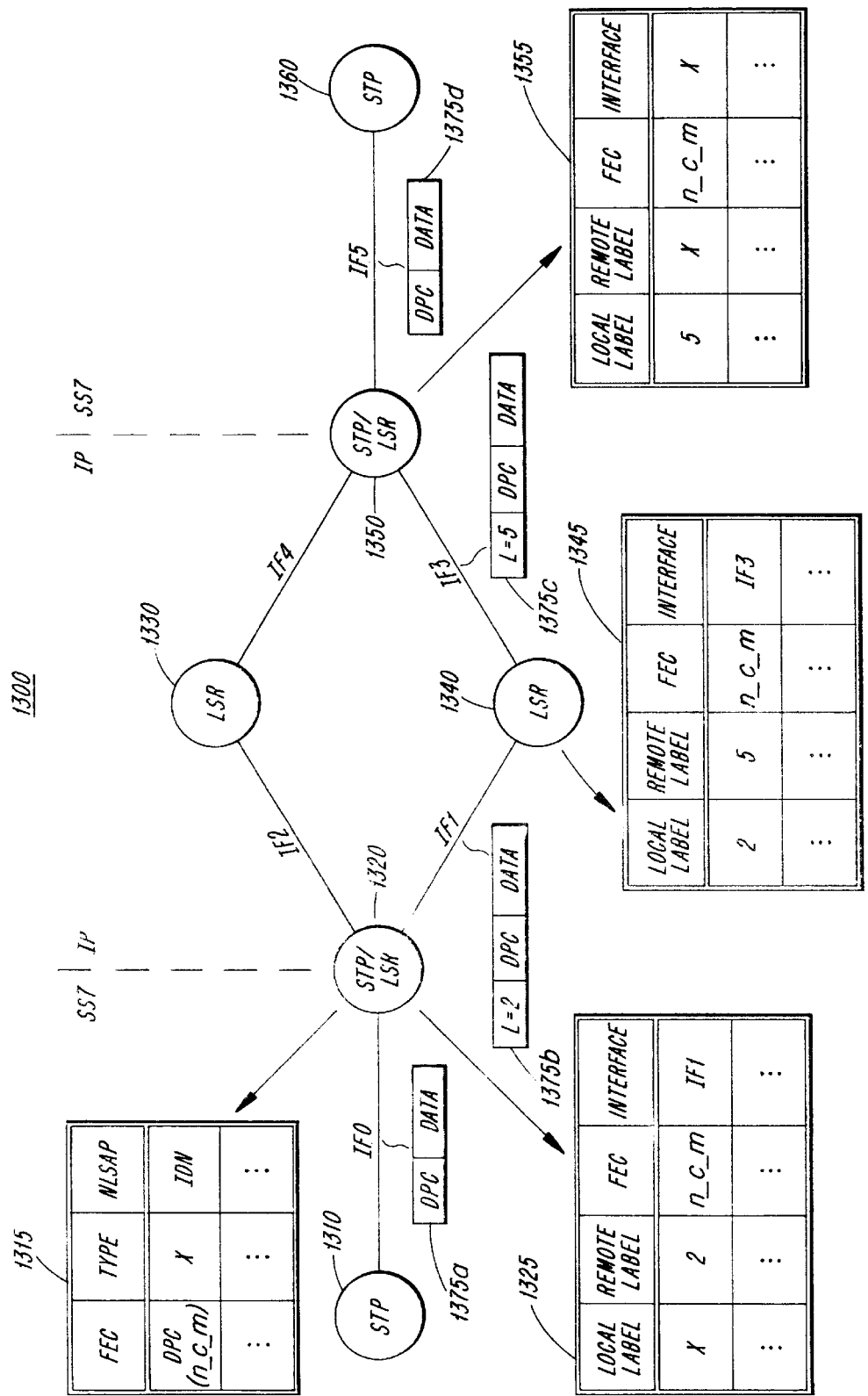
FIG. 13 depicts an exemplary data packet flow in a heterogenous network according to the invention.

In FIG. 13, an exemplary heterogenous network 1300 includes an originating SS7-type STP 1310, a first hybrid STP/LSR 1320, first and second intermediary IP-type LSRs 1330, 1340, a second hybrid STP/LSR 1350, and a destination SS7-type STP 1360. As shown, the originating STP 1310 is coupled to the first hybrid STP/LSR 1320 via a first interface IFO, and the first hybrid STP/LSR 1320 is coupled to each of the intermediary LSRs 1330, 1340 via interfaces IF2, IF1, respectively. Each of the intermediary LSRs 1330, 1340 is coupled to the second hybrid STP/LSR via an interface IF4, IF3, respectively, and the second hybrid STP/LSR is coupled to the destination STP via an interface IF5. As with FIG. 9, those of ordinary skill in the art will appreciate that the below described functionality of the STP/LSRs of FIG. 13 can be implemented using, for example, known digital signal processing components and/or a general purpose digital computer.

Table 1315 in the figure indicates that an exemplary SS7-based FEC has been defined to include a particular exemplary DPC named n_c_m (i.e., a particular SS7 network cluster member; those of skill in the art will appreciate that the name n_c_m is arbitrary and provided for illustrative purposes only). As shown in table 1315, the STP/LSRs and the LSRs maintain a type code for each defined FEC (e.g., in the case of the exemplary FEC n_c_m, the type field would indicate that the FEC is of type "DPC"). In addition to type "DPC", the FEC type can be "global title number", "SS7 subsystem number", etc. (and combinations thereof), as described above. Thus, the table 1315 can, in practice, include any number of FECs, each FEC having a particular name and type.

The SS7 routing tables in the Network Layer (existing) will forward the packet to the MPLS label layer instead of the SS7 link layer when being routed through an MPLS network. Thus, the tables can be modified, according to the invention, to include an identifier indicating whether each FEC is to be routed to the SS7 MTP2 or the MPLS label layer. Additionally, as shown in table 1315, the STP/LSRs also maintain an internal Network Layer Service Access Point (NLSAP) identifier for each defined FEC. The identifier indicates which upperlayer protocol (i.e., MTP3 or IP, AppleTalk, etc.) each FEC is associated with.

As shown in table 1325, the STP/LSR 1320 has established a label binding for the exemplary FEC n_c_m. In particular, the STP/LSR 1320 has associated a numeric label (which, although shown as a 2 in the figure for illustration, can be any unique identifier), as well as a particular forwarding interface (IFI) with the exemplary FEC n_c_m. In the figure, it is presumed that such label binding has been advertised in the MPLS network using the above described LDP mechanism. Consequently, as shown in tables 1345 and 1355, respectively, the LSR 1340 and the second STP/LSR 1350 have established label bindings and routing table entries for the FEC n_c_m as well.

Once the FEC n_c_m is defined, and the corresponding label bindings established and advertised, data packets associated with the FEC n_c_m can be routed throughout the heterogeneous network. For example, in FIG. 13, an SS7-type data packet 1375*a* is transmitted from the originating STP 1310 to the first STP/LSR 1320, and includes a DPC equal to n_c_m. Thus, the first STP/LSR 1320 prepends a label (2 in the example of the figure) to the data packet 1375*a*, and transmits the labeled packet 1375*b* to the intermediary LSR 1340 via interface IF1.

Upon receiving the labeled packet 1375*b*, the intermediary LSR 1340 switches the label (according to the LSR's local routing table 1345), and transmits the label-switched packet 1375*c* to the second STP/LSR 1350. The second STP/LSR 1350 then strips the label from the data packet 1375*c* and forwards (in accordance with its own routing table 1355) the label-less data packet 1375*d* (which is identical to the original data packet 1375*a*) on to the destination STP 1360. Thus, the SS7-type data packet is seamlessly transmitted from one SS7 network to another, via an intermediary IP-based network.

Note that since SS7 networks conventionally provide reliability, low delay and no jitter compared to the best-effort IP networks, Quality of Service becomes an issue when inter-networking an SS7 network and an IP network through MPLS. According to the invention, traffic specifications within SS7 packets are mapped into the MPLS Class of Service field so that the network layer can provide traffic differentiation based on service requested from upper layers.

Those skilled in the art will appreciate that the present invention is not limited to the specific exemplary embodiments which have been described herein for purposes of illustration and that numerous alternative embodiments are also contemplated. The scope of the invention is therefore defined by the claims appended hereto, rather than the foregoing description, and all equivalents which are consistent with the meaning of the claims are intended to be embraced therein.

What is claimed is:

1. A method of routing Signaling System Number 7 (SS7) data packets through a heterogeneous packet-switching network using Multi-Protocol Label Switching (MPLS), comprising the steps of:

establishing an MPLS forwarding equivalence class (FEC), at least one element of the FEC being an SS7 destination;

associating a label with the FEC at a first router in the heterogeneous packet switching network;

attaching the label, at the first router, to a data packet belonging to the FEC; and forwarding the labeled data packet from the first router to a second router in the communications network.

2. A method according to claim 1, wherein the SS7 destination is a Destination Point Code (DPC).

3. A method according to claim 1, wherein the SS7 destination is Signaling Connection Control Part (SCCP) global title.

4. A method according to claim 1, wherein the SS7 destination is an SCCP subsystem number (SSN).

5. A method according to claim 1, wherein the FEC includes a plurality of FEC elements selected from the group of DPC, global title, SSN, SS7 Country Code and SS7 National code.

6. A method according to claim 1, further comprising the step of advertising the label associated with the FIEC at the first router to other routers in the communications network.

7. A method according to claim 6, wherein the label association is advertised via a label distribution protocol (LDP).

8. A method according to claim 6, wherein each of a number of intermediary routers in a communications path of the data packet associates a label with the FEC of the data packet, and wherein each intermediary router in the path re-labels the data packet when forwarding the data packet to a next router.

9. A method according to claim 1, wherein the first router maintains a label information table including a plurality of FECs and associated labels, wherein a number of the FECs include SS7-based elements and another number of FECs Include non-SS7-based elements, and wherein the first router can serve as a destination for both SS7 data packets and non-SS7 data packets.

10. A method according to claim 9, wherein the label information table includes an internal identifier for each FEC, the internal identifier indicating which of a number of network layer (layer 3) protocols is used to convey data packets belonging to each FEC.

11. A Multi-Protocol Label Switching (MPLS) router for use in a heterogeneous packet switching communications network having at least one Internet Protocol (IP)-based portion and at least one Signaling System Number 7 (SS7)-based portion, said MPLS router comprising:

a routing table that stores information relating to an MPLS forwarding equivalence class (FEC), wherein an element of the FEC is a Signaling System Number 7 (SS7) destination; and a label switching protocol processor that associates a label with the FEC, attaches the label to a data packet belonging to the FEC, and forwards the labeled data packet to another router in the communications network;

whereby MPLS routing techniques are utilized seamlessly throughout the IP-based portions and SS7-based portions of the network.

12. A router according to claim 11, wherein an element of the FEC is an SS7 Destination Point Code (DPC).

13. A router according to claim 11, wherein an element of the FEC is a, Signaling Connection Control Part (SCCP) global title.

14. A router according to claim 11, wherein an element of the FEC is an SCCP subsystem number (SSN).

15. A router according to claim 11, wherein the FEC includes a plurality of FEC elements selected from the group of DPC, global title, SSN, SS7 Country Code and SS7 National code.

16. A router according to claim 11, further comprising a label distribution processor configured to advertise the label associated with the FEC to other routers In the communications network.

17. A router according to claim 16, wherein the label distribution processor advertises labels via a label distribution protocol (LDP).

18. A router according to claim 11, wherein each of a number of intermediary routers in a communications path of the data packet associates a label with the FEC of the data packet, and wherein each intermediary router in the path re-labels the data packet when forwarding the data packet to a next router.

19. A router according to claim 11, wherein the routing table includes a plurality of FECs and associated labels, wherein a number of the FECs include SS7-based elements and another number of FECs include non-SS7-ased elements, and wherein the router can serve as a destination for both SS7 data packets and non-SS7 data packets.

20. A router according to claim 19, wherein the routing table includes an internal identifier for each FEC, the internal identifier indicating which of a number of network layer (layer 3) protocols Is used to convey data packets belonging to each FEC.

* * * * *